March 12, 1963  J. R. WALL ET AL  3,080,613
METHOD OF MOLDING A POLYURETHANE FOAM OBJECT
HAVING A RELATIVELY FLAT TOP SURFACE
Filed Jan. 28, 1960  3 Sheets-Sheet 3

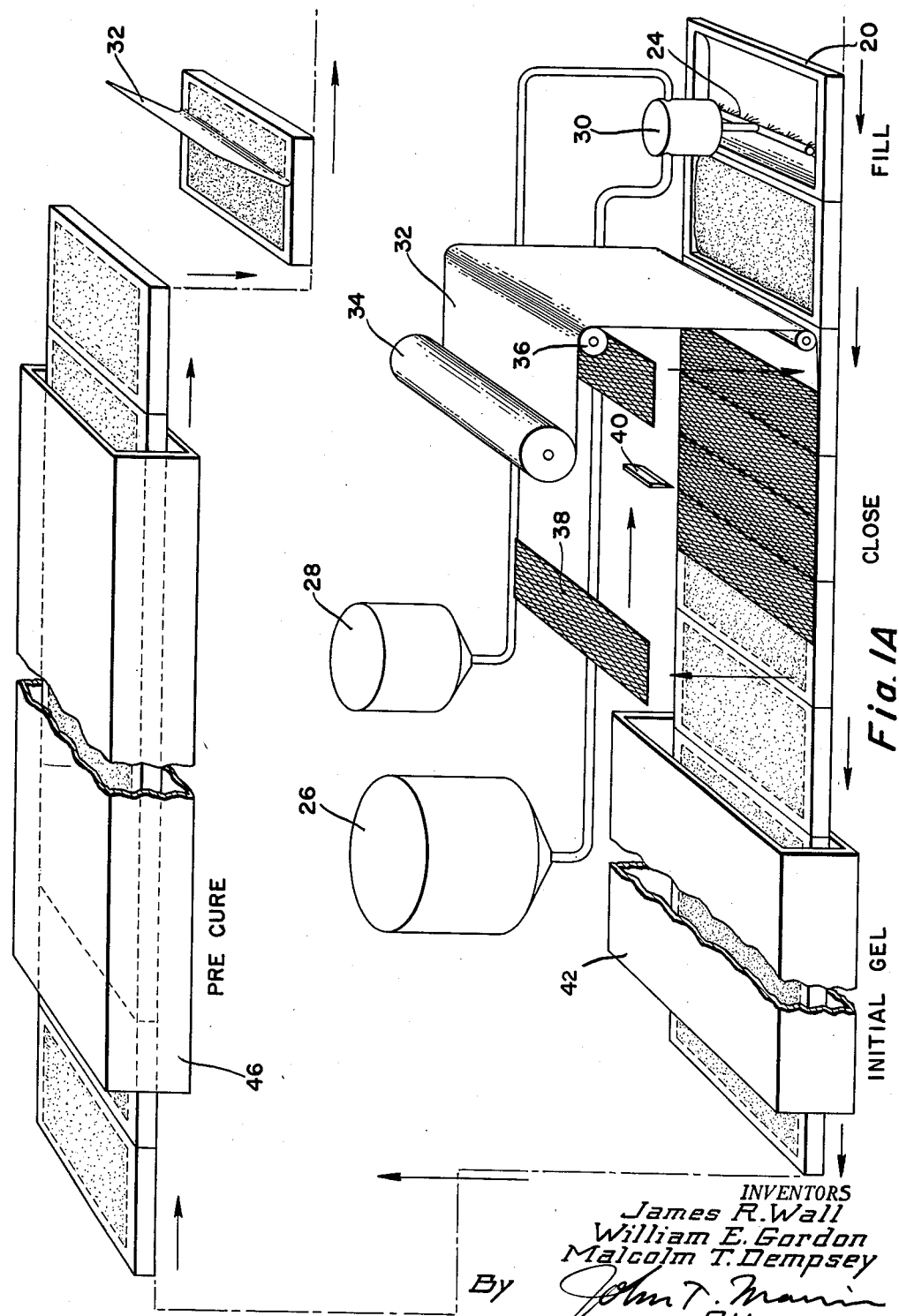

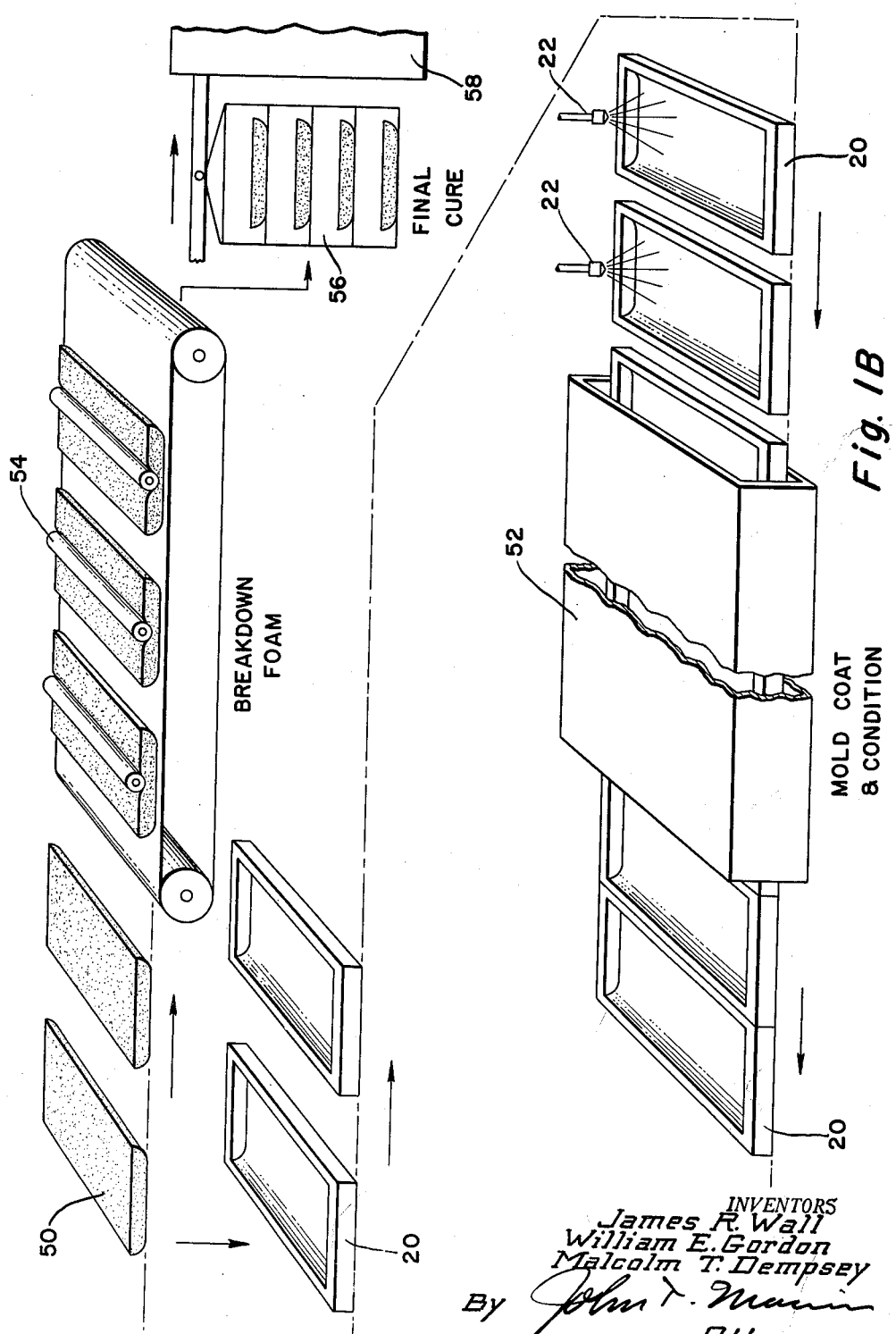

INVENTORS
James R. Wall
William E. Gordon
Malcolm T. Dempsey
By John T. Mann
Attorney 3,080,613
METHOD OF MOLDING A POLYURETHANE FOAM OBJECT HAVING A RELATIVELY FLAT TOP SURFACE
James R. Wall and William E. Gordon, Dayton, and Malcolm T. Dempsey, Lewisburg, Ohio, assignors to General Motors Corporation, Detroit, Mich., a corporation of Delaware
Filed Jan. 28, 1960, Ser. No. 5,264
6 Claims. (Cl. 18—48)

This invention relates to a method for making foamed elastomeric sheet material.

It is one of the objects of the inventon to provide a method for making molded slabs from foamed elastomeric material wherein the mold in which the slab is formed permits breathing but does not permit the exudation of the foamed material therefrom.

In carrying out this object, it is a further object of the invention to cover the mold, after the foamable material is placed therein, with a flexible, permeable sheet which allows air within the mold to exhaust therefrom as the foamable material expands but which does not limit the extent of the foaming so as to cause a breakdown of the foam whereby the previous difficulties of using closed molds are substantially eliminated.

A further object of the invention is to provide a mold for foaming polyurethanes wherein a predetermined quantity of foamable polyurethane material is placed in the mold and the mold is covered with a sheet of thin, perforated plastic material and wherein a supporting shield of metal is placed over the plastic material whereby, as the polyurethane foams, the residual air within the mold escapes through the perforations in the plastic sheet and, when the polyurethane reaches the sheet it distributes within the mold until the limit of its expansion is reached, the plastic being sufficiently flexible to enter portions of the shield whereby no excessive pressures are placed on the polyurethane such as would normally cause a breakdown in the foam.

A still further object of the invention is to provide a method for molding polyurethane foam to the desired shape and size and to eliminate cutting or slicing operations as previously practiced.

In the molding of polyurethane foam, it is well known that closed molds and the like have been undesirable due to the fact that the polyurethane foam will break down if any substantial pressure is imposed thereon such as is always experienced in a closed mold. For this reason, polyurethane foams of the flexible type are normally molded in an open mold wherein the finished product resembles a loaf of bread and wherein the crown of the product must be cut or sliced off to form a relatively uniform slab of the foam, such slabs being used in mattresses, pillows, cushions and the like.

This operation is not only costly but it wastes considerable material and it has one other major drawback in that the cut surface of the foam has been deprived of its mold surface or skin whereby the foam tears easily and absorbs water quite readily.

The present invention is directed to a method for molding slab material from polyurethane wherein a mold surface is provided on all sides of the slab and wherein the foam is devoid of the normal breadcrust surface.

Further objects and advantages of the present invention will be apparent from the following description, reference being had to the accompanying drawings wherein preferred embodiments of the present invention are clearly shown.

In the drawings:
FIGURE 1A shows diagrammatically an apparatus for making polyurethane slabs in several positions in the process.

FIGURE 1B is an extension of FIGURE 1A showing the remainder of the process.

Specifically, we have found that, when foamable polyurethane material is placed in proper quantities within a mold and is permitted to expand normally, this material will distribute within the mold within limits to form a slab of uniform thickness. In this connection, it is well known that polyurethane foam is easily broken down when excessive pressure is applied thereto whereby the foam falls in much the same way that a bread dough will fall if pressure is applied to the rising material. In order to prevent this from happening, we propose to cover the mold with a flexible sheet of plastic material which is of a breathable nature. In this connection, we have found that polyethylene sheet material of from 2 to 4 mils thick may be passed over a wire perforating roll wherein the wires or needles have a diameter of from .02 to .045 inch wherein each aperture formed by the wire or needle is a small valve due to the fact that the bristles puncture the material rather than cut it out whereby the material broken away from the main sheet is hinged thereto at one side. The perforations are preferably spaced in rows of one-fourth to one-half an inch in all directions. A satisfactory device for perforating the sheet is a standard carding roll, such as described in copending application, Serial No. 822,906, filed June 25, 1959, assigned to the assignee of the present invention, and it is to be understood that the specific limitations as to thickness of sheet, size of perforations and spacing of perforations, are directed to the preferred embodiment and that variations therefrom may be carried out so long as the mold is properly vented and the plastic material therein is properly supported. Also, in place of polyethylene, polyester films such as Mylar and polyvinyl chloride or other plastic material which is not adversely affected by the polyurethane foam may be used.

This perforated polyethylene sheet is next placed over the mold containing a proper quantity of foamable polyurethane material distributed uniformly over the bottom thereof. On top of the polyethylene sheet is placed a grill or grating of open-work metal which supports the polyethylene against excessive distortion but which permits the polyethylene to crowd upwardly into the open-work structure of the sheet whereby no excessive pressure is ever placed upon the polyurethane of the order which would cause falling or break-down of the foam but which will limit its movement to facilitate distribution thereof within the mold. After the foam is distributed and fully set, the grills are removed and the foam is cured whereupon the polyethylene sheet material may be peeled therefrom without in any way destroying or harming the surface skin. Subsequent operations may be carried out on the sheet material so formed.

Figure 3:
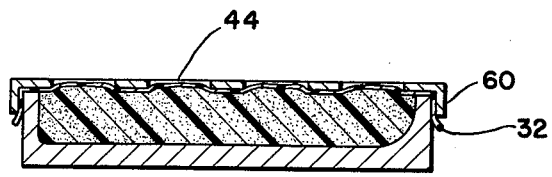
FIGURE 3 is a section taken on line 3—3 of FIGURE 2.

Specifically referring to the drawings, a diagrammatic showing of the apparatus and process will be found in FIGURES 1A and 1B wherein a plurality of molds 20 are progressively coated with a suitable mold coat such as "carbowax" through nozzles 22 as shown in FIGURE 1B. The molds 20 then pass under a multiple-hole distribution head 24 which is supplied from supply tanks 26 and 28 through a mixer 30. It is understood that the particular mixing and supply apparatus will vary in accordance with the way the foamable material is made. However, this is one satisfactory means of accomplishing the mixing procedure. It is understood that, if the part to be molded in the mold 20 varies in thicknesses, that is, if the edges are to be rounded off and are thinner than the center section thereof, etc., the distributing head 24 may be programmed to move over the mold laterally so that varying thicknesses of foamable material are laid on the surface of the mold. Also, the diameter of the apertures in the distributing head 24 may vary so that variable quantities of the foamable material are laid into different portions of the mold. The molds 20 pass the distributing head 24 and are next covered with a sheet of polyethylene material 32 which preferably comes from a roll of the material 34. The sheet is of a size to extend from one side of the mold to the other end as it passes to the mold and passes over a perforating brush or roller 36 which punctures the surface thereof in desired fashion. In order to hold the polyethylene sheet 32 onto the surface of the mold 20, open-work metal grills 38 are progressively placed on top of the sheet whereby the sheet of polyethylene 32 is sandwiched between the grills 38 and the molds 20. In order to make the process more flexible, after the grills 38 are in place, a knife 40 passes between the molds and cuts the polyethylene sheet as the molds move toward an initial gelling oven 42. The gelling or setting oven 42 is placed a sufficient distance from the initial fill station to permit the foam to fully rise and, during this procedure, air within the mold exhausts through the punctures in the polyethylene sheet and the polyurethane rises until it contacts a surface of the sheet and forces portions of the sheet to enter the open-work structure of the grill as shown at 44 in FIGURE 3. Since the quantity of the foamable polyurethane material is accurately measured as it is supplied to each mold, there is substantially no excess within the mold whereby the top surface of the foamed polyurethane, which is formed against the plastic sheet, is relatively flat and includes a plurality of visible bumps at the free areas between the grill-work of the grill 38. After the foaming is complete, the covers 38 may be lifted from the mold and returned to the line for subsequent use. The molds, with the foamed polyurethane therein, then pass through a gelling oven 44 and onto a pre-curing oven 46. When the pre-cure is completed, the sheet of polyethylene, which is still in place, may be peeled from the formed material without in any way harming the surface of the polyurethane. In this connection, polyethylene is particularly desirable because of its somewhat waxy surface. This resists any tendency to stick. Of course, the plastic sheet may be treated with a lubricant if desired in the event other more adherent materials are used.

The next step is shown in FIGURE 1B wherein slabs 50 of pre-cured polyurethane are removed from the molds 20 and the molds 20 are routed back to the coating station wherein mold coat is sprayed thereon through nozzles 22. These coated molds pass through a conditioning oven 52 and are then ready to again be supplied with foamable polyurethane material.

The slabs 50, if they are to be used for seat cushions, for example, are preferably next squeezed or rolled between pressure rollers 54 to break any closed cell structure that is present therein and, thereafter, the cushions are placed on a conveyor 56 and finally cured in an oven 58.

Figure 2:
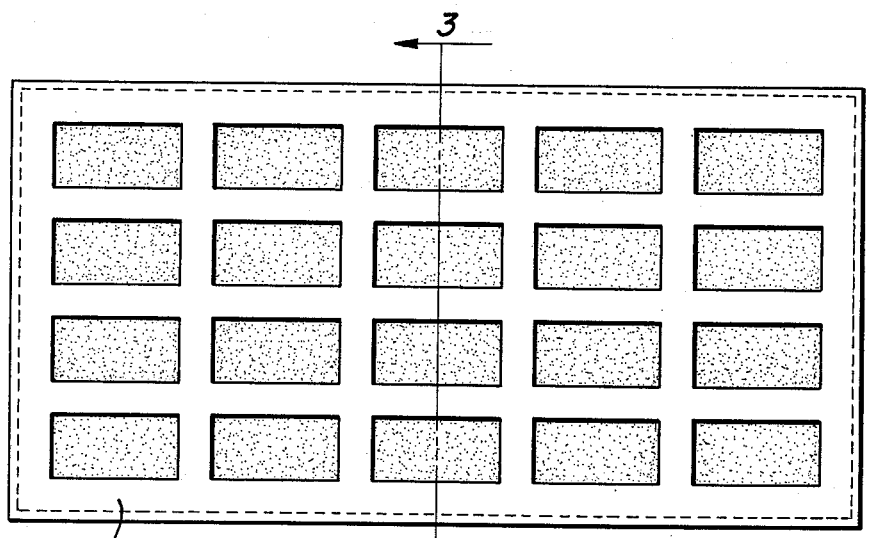
FIGURE 2 is a plan view of the top of one of the molds.

The specific physical characteristics of the grills or covers 38 are of no great importance providing sufficient support is provided for the polyethylene sheet to prevent any major distortion thereof. One of said configurations for the grill 38 is shown in FIGURE 2. In general, however, any openwork metal panel may be used, such as a sheet of expanded metal or the like. Care must be taken that the open portions of the cover are of sufficient area to permit sufficient expansion of the foam therethrough to prevent any possible break-down of the foam. In this connection, the open area should be at least equal the solid area. However, if the mold is properly filled, and this may be determined by a trial run, there is very little danger of break-down of the foam.

It will be noted that the cover 38 overlaps the mold at 60 whereby the polyethylene sheet 32 is clamped along the lateral sides of the molds and, since the process is a continuous one and the sheet 32 is not cut between molds by means of knife 40 until the foam is fully expanded and set, the polyethylene sheet 32 is held under tension to prevent free expansion through the openings of the covers.

In general, molded slab material used in mattresses, cushions, pillows and the like having a slightly uneven surface is completely acceptable. However, if a completely smooth surface is desired, it is possible to slice off the small protuberances found on the one surface. In any event, it is apparent that the method disclosed eliminates to a large extent the waste material normally present in blown polyurethane materials wherein a bread-loaf effect is present from open top molding.

Any of the usual polyurethane formulations used in the manufacture of cushions and the like may be used with this apparatus. For example, a suitable formulation is as follows.

*Prepolymer*

| | Parts by weight |
|---|---|
| Polypropylene glycol (2000 molecular weight) | 100.00 |
| Toluene diisocyanate | 43.50 |
| Water | 0.30 |
| Silicone (dimethyl siloxane fluid) | 1.10 |

*Catalyst*

| | |
|---|---|
| N-methyl morpholine | 1.00 |
| Triethylamine | 0.30 |
| Water | 2.14 |

The prepolymer is placed in tank 26 and the catalyst is maintained in tank 28. The two ingredients are mixed in the mixing head 30 in the desired proportions by weight of 100 parts of the prepolymer to 3.44 parts of the catalyst and are then supplied to the mold through the multiple-hole device 24.

We are aware of closed top molds having been used in the molding of various materials but, in all instances, these molds have included a nonflexible cover which, in many instances, has been perforated. We have found that a perforated cover, for example, a sheet metal cover with perforations, is not satisfactory in the present instance since it will cause a break-down of the foam due to the fact that, as the foam reaches its maximum height, it is not as flowable as in the initial instance, and, since polyurethane foams are of a very viscous nature, the escape of excess foam is retarded sufficiently to cause it to fall. Therefore, the excess pressure cannot be relieved through small vents in a metal mold. In the present instance, however, the polyethylene sheet is sufficiently mobile to move upwardly into the open-work structure of the cover 38 to relieve sufficient pressure to prevent any break-down of the foam. The small punctures or perforations in the polyethylene sheet are merely used as a means for exhausting the air from the mold as the polyurethane rises. These punctures or perforations are of such a small size that the polyurethane, when contacting the sheet, does not have any tendency to pass therethrough due to its highly viscous nature at this stage of the process.

In some cases, to facilitate production and avoid high degree accuracy in measuring and control, the grill or cover 38 may be loosely carried by the mold so as to float whereby, if a very slight excess of foam is present, the cover with the perforated sheet will move upwardly in the order of a fraction of an inch. After gelling, the cover may be mechanically or manually pressed down to the top of the mold to post-form the gelled foam without causing any break-down thereof.

From the foregoing, it is apparent that we have provided a breathable cover for the mold which permits the elimination of air therefrom and which is of such a flexible and mobile nature that it permits sufficient expansion of the polyurethane to prevent break-down during rising of the foam. This allows the mold to be properly filled so that all portions thereof are faithful in their representation of the mold shape on the molded article.

While the embodiments of the present invention as herein disclosed constitute preferred forms, it is to be understood that other forms might be adopted.

What is claimed is as follows:

1. The method of molding a foamable polyurethane material and simultaneously forming a relatively flat top surface thereon without causing a break-down of the foam, the steps comprising; providing an open top mold, placing a quantity of foamable plastic material in the bottom of the mold sufficient to ultimately fill the mold upon forming thereof, covering the open top of the mold with breathable and flexible non-adhering sheet material, limiting outward movement of said sheet with a substantially non-flexible supporting shield having open areas of a size to permit portions of said sheet to enter said open areas while preventing free movement of the sheet, foaming the plastic material for causing the same to rise into contact with the sheet material and simultaneously causing the foam to distribute against the sheet and to partially press the sheet through said shield to foam a relatively flat surface on the top surface of the foam.

2. In a method for molding polyurethane foam in a closed mold to a predetermined shape, the steps of, pouring a predetermined quantity of foamable polyurethane material into a mold having an open top and an immobile mold cavity therein, closing the open top of said mold cavity with a perforated and flexible sheet of polyethylene, limiting outward movement of said sheet with a substantially non-flexible shield having open areas of a size to permit portions of said sheet to enter said open areas while preventing free outward movement of the polyurethane, causing the polyurethane material to rise within the mold into contact with said polyethylene sheet while simultaneously permitting air from the mold to exhaust through the perforations in said sheet, and preventing free movement of the polyethylene sheet by means of said shield whereby the top surface of the molded polyurethane is substantially flat and includes a mold skin thereover.

3. The method as claimed in claim 1 wherein the foam material, after distributing in the mold, is allowed to set.

4. The method as claimed in claim 3 wherein the sheet material is subsequently peeled from the set foam.

5. The method as claimed in claim 2 including the added step of causing the foam to set in the mold after it has come coextensively in contact with the polyethylene sheet.

6. The method as claimed in claim 5 with the added steps of subsequently removing the supporting structure and peeling the polyethylene sheet from the surface of the molded polyurethane.

References Cited in the file of this patent

UNITED STATES PATENTS

| 2,898,626 | Alderfer et al. | Aug. 11, 1959 |
| 2,898,634 | Alderfer | Aug. 11, 1959 |
| 2,975,488 | Brauner | Mar. 21, 1961 |

FOREIGN PATENTS

| 539,786 | Great Britain | Sept. 24, 1941 |

OTHER REFERENCES

Rubber World, vol. 139, No. 5, Molding of Prepolymer Based Resilient Urethane Foam, pp. 685–692, February 1959.